US009832073B2

(12) United States Patent
Prieto et al.

(10) Patent No.: US 9,832,073 B2
(45) Date of Patent: Nov. 28, 2017

(54) ANALYZING NETWORK CONFIGURATION COMPLEXITY

(71) Applicant: Cisco Technology, Inc., San Jose, CA (US)

(72) Inventors: Alberto Gonzalez Prieto, Mountain View, CA (US); Alexander L. Clemm, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 216 days.

(21) Appl. No.: 14/056,688

(22) Filed: Oct. 17, 2013

(65) Prior Publication Data
US 2015/0113001 A1    Apr. 23, 2015

(51) Int. Cl.
*G06F 17/30* (2006.01)
*H04L 12/24* (2006.01)

(52) U.S. Cl.
CPC .... *H04L 41/0853* (2013.01); *G06F 17/30861* (2013.01); *H04L 41/0856* (2013.01); *H04L 41/14* (2013.01); *H04L 41/084* (2013.01); *H04L 41/0813* (2013.01); *H04L 41/0823* (2013.01)

(58) Field of Classification Search
CPC .............. G06F 17/30011; G06Q 10/10; H04L 41/0873; H04L 41/0886
USPC ........ 707/748, 634, 792, 802; 709/223, 224, 709/226, 227, 220; 370/329; 705/7.36; 706/46; 725/107
See application file for complete search history.

(56) References Cited

U.S. PATENT DOCUMENTS

| 5,954,797 | A  | * | 9/1999  | Sidey      | 709/223         |
|-----------|----|---|---------|------------|-----------------|
| 5,999,610 | A  | * | 12/1999 | Lin        | H04M 3/4217     |
|           |    |   |         |            | 370/259         |
| 6,223,220 | B1 | * | 4/2001  | Blackwell  | H04L 41/0233    |
|           |    |   |         |            | 709/220         |
| 6,397,370 | B1 | * | 5/2002  | Fernandez  | G06F 17/505     |
|           |    |   |         |            | 716/103         |
| 6,519,660 | B1 | * | 2/2003  | Rooney     | G06F 9/5077     |
|           |    |   |         |            | 709/220         |
| 6,567,812 | B1 | * | 5/2003  | Garrecht   | G06F 17/30991   |
|           |    |   |         |            | 707/708         |
| 6,571,249 | B1 | * | 5/2003  | Garrecht   | G06F 17/30696   |
| 6,970,803 | B1 | * | 11/2005 | Aerdts     | C06Q 10/06      |
|           |    |   |         |            | 702/179         |
| 7,152,026 | B1 | * | 12/2006 | Merritt    | G06F 11/2028    |
|           |    |   |         |            | 703/13          |

(Continued)

OTHER PUBLICATIONS

Sun et al., "Modeling Complexity of Enterprise Routing Design", CoNEXT' 12, Dated Dec. Oct. 13, 2012, 12 pages.

(Continued)

*Primary Examiner* — Frantz Coby
(74) *Attorney, Agent, or Firm* — Hickman Palermo Becker Bingham LLP

(57) ABSTRACT

Techniques are provided for generating a network complexity score. In one approach, a plurality of node configurations that includes a first node configuration and a second node configuration are analyzed. A network complexity score is generated for a network based, at least in part, on one or more of (a) a degree of similarity between the first node configuration and the second node configuration or (b) a dependency between the first node configuration and the second node configuration.

20 Claims, 4 Drawing Sheets

(56) References Cited

U.S. PATENT DOCUMENTS

| | | | |
|---|---|---|---|
| 7,313,616 B1* | 12/2007 | Carroll et al. | 709/224 |
| 7,685,286 B2* | 3/2010 | Brown et al. | 709/226 |
| 7,792,772 B2* | 9/2010 | Ashcraft et al. | 706/46 |
| 8,140,567 B2* | 3/2012 | Padovitz | G06F 17/30011 707/769 |
| 8,271,646 B2* | 9/2012 | Brown et al. | 709/224 |
| 8,391,378 B2* | 3/2013 | Duvaut | H04L 25/03184 375/260 |
| 8,635,345 B2* | 1/2014 | Brown et al. | 709/227 |
| 8,700,637 B2* | 4/2014 | Riepshoff et al. | 707/748 |
| 8,868,712 B2* | 10/2014 | Kiris et al. | 709/223 |
| 9,146,822 B2* | 9/2015 | Patankar | G06F 11/2097 |
| 2003/0128832 A1* | 7/2003 | Beltran | H04Q 3/0025 379/229 |
| 2005/0097146 A1* | 5/2005 | Konstantinou | H04L 41/0866 |
| 2005/0169179 A1* | 8/2005 | Antal | H04L 41/0806 370/231 |
| 2006/0067234 A1* | 3/2006 | Bossi | H04L 12/24 370/238 |
| 2008/0034070 A1* | 2/2008 | Tan et al. | 709/220 |
| 2009/0232232 A1* | 9/2009 | Duvaut | H04L 25/03184 375/260 |
| 2010/0166314 A1* | 7/2010 | Shi et al. | 382/189 |
| 2012/0185553 A1* | 7/2012 | Nelson | 709/209 |
| 2013/0132590 A1* | 5/2013 | Levenshteyn | H04L 65/1069 709/227 |
| 2013/0144990 A1* | 6/2013 | Gao | G06F 9/5072 709/220 |
| 2013/0253990 A1* | 9/2013 | Richards et al. | 705/7.36 |
| 2014/0164592 A1* | 6/2014 | Archer et al. | 709/224 |
| 2014/0177544 A1* | 6/2014 | Kumar et al. | 370/329 |
| 2014/0189086 A1* | 7/2014 | Chattopadhyay | H04L 41/145 709/223 |
| 2014/0337471 A1* | 11/2014 | Yasuda | G06F 9/5072 709/217 |
| 2014/0344874 A1* | 11/2014 | Olsen | 725/107 |

OTHER PUBLICATIONS

Benson et al., "Unraveling the Complexity of Network Management", NSDI dated 2009, 6$^{th}$ USENIX Symposium on Networked Systems Design and Implementation, 14 pages.

Brown et al., "A Model of Configuration Complexity and its Application to a Change a Management System", Proceedings of the 9$^{th}$ IFIP/IEEE, International Symposium on Integrated Network Management (dated May 2005), 14 pages.

* cited by examiner

ANALYZING NETWORK CONFIGURATION COMPLEXITY

TECHNICAL FIELD

The present disclosure generally relates to network management and, more particularly, to quantifying the configuration complexity of nodes in a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Data communication networks may comprise large numbers of devices, some of which are of varying types. Each network device maintains its own configuration, often of considerable complexity. A typical network device, such as a router or switch, provides a command interface that is accessible using character-based commands through Telnet, Secure Shell (SSH), and a serial port interface for changing the device status or configuration. Each configuration command has an associated syntax. A Network Management Station (NMS) can use configuration commands to provide a higher level or enhanced management capability to the network operator. To do so, a NMS requires knowledge of the device configuration commands and the syntax of the commands to accomplish changing the configuration of a device.

One way of provisioning a configuration on a device is to issue one or more commands manually. Human operators may find it impossible to remember the syntax and semantics associated with each kind of device and for each type of configuration. Each device on each interface may require a different configuration command and the semantics for each may vary. In addition, even in similar types of devices, different vendors may adopt different standards, making the task of configuration even more complex.

Furthermore, there are multiple dependencies between network devices, often requiring certain aspects of their respective configuration to be properly coordinated. As a result, the configuration of networks in their entirety has become increasingly complex.

Configuration complexity lies at the heart of many issues. For example, configuration complexity leads to errors, compromising the network. By some accounts, human configuration errors are responsible for more than 50% of network downtime and the root cause of more than 50% of successful cyber-attacks.

Also, it is difficult to troubleshoot and analyze networks whose configurations are complex. While automated tools are good at addressing routine tasks, such tools reach their limits when difficult-to-solve problems arise. The effectiveness to address such problems is generally a function of the complexity of the network and its configuration.

Additionally, configuring a network is labor-intensive, footprint-intensive, and performance-intensive. For example, many lines of configuration may need to be entered or generated for each network device. Configuration requires storage and memory while validating and applying configurations requires CPU.

DESCRIPTION OF EXAMPLE EMBODIMENTS

New techniques for analyzing network configuration complexity are described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 Overview
2.0 System Overview
3.0 Node Configuration
4.0 Complexity Factors
5.0 Analysis Of Network Configuration Complexity
5.1 Assessment of Complexity Across A Set of Network Nodes
5.2 Determining Incremental Set of Nodes
5.3 Graphical Representation
6.0 Implementation Mechanisms—Hardware Overview
7.0 Extensions and Alternatives 1.0 Overview New techniques for analyzing network configuration complexity are described. In one approach, a plurality of node configurations is identified where each node configuration corresponds to a different node in a network. Initially, each node configuration is in a candidate set. A candidate set comprises nodes configurations that have not yet been added to an assessment set. An assessment set includes node configurations whose complexities have been considered when generating a network complexity for the set of node configurations in the assessment set. A first node configuration is removed from the candidate set and added to the assessment set, which is initially empty. A first complexity score is generated for the assessment set. A second node configuration is removed from the candidate set and added to the assessment set. A second complexity score is determined for the assessment set based on the first and second node configurations. The complexity scores and the order in which node configurations are added to the assessment set may be used to display complexity score information to a user.

In a related approach, a plurality of node configurations is analyzed. Each node configuration corresponds to a different node in a network. A comparison between two node configurations is made and either a dependency between the two node configurations is identified or a degree of similarity between the two node configurations is determined. A network complexity score for the network is generated based on the comparison.

Various embodiments encompass a computer apparatus and a computer-readable medium configured to carry out the foregoing operations.

2.0 System Overview

Figure 1:
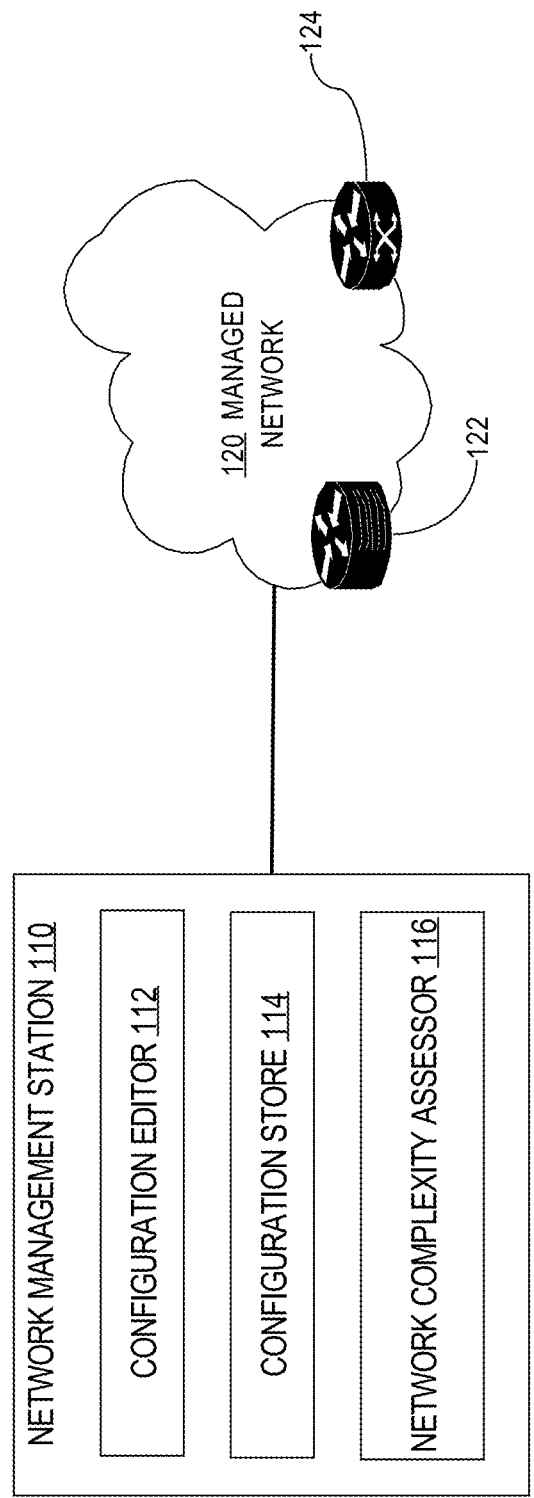
FIG. 1 illustrates an example system for calculating one or more complexity scores for a network, in an embodiment.

FIG. 1 illustrates an example system 100 for calculating one or more complexity scores for a network, in an embodiment. System 100 includes a network management station (NMS) 110 and a managed network 120 that includes nodes 122, 124. NMS 110 is communicatively coupled to a managed network 120. Although NMS 110 is depicted as a single computing device, NMS 110 may comprise multiple computing devices, two or more of which are communicatively coupled to the managed network 120. Similarly, although only two nodes are depicted as belonging to managed network 120, managed network 120 may include many more nodes. A node may be any type of internetworking network device, such as a router or a switch, or end station units such as printers, scanners, or computers of any type.

NMS 110 includes a configuration editor 112 that is configured to create node configurations and to modify existing node configurations. Configuration editor 112 stores one or more configuration files, each comprising one or more configuration commands/items for a particular device or device type, in configuration store 114. Configuration store 114 may comprise disk storage on a personal computer, workstation, or server. Configuration files in configuration store 114 may include information identifying whether a particular file represents a startup configuration, running configuration, or other kind of configuration.

NMS 110 also includes a network complexity assessor 116 that determines a complexity score or metric for managed network 120 and, optionally, other managed networks not shown. Network complexity assessor 116 may be may be implemented using stored program logic in a special-purpose computer or loaded from one or more non-transitory media into the memory of a general-purpose computer and then executed. Alternatively, network complexity assessor 116 is implemented using special-purpose hardware logic for performing the processes described herein.

For purposes of illustrating a clear example, network complexity assessor 116 is shown as residing on a NMS, but in other embodiments, network complexity assessor 116 may reside on any computing device that has access to configurations of multiple nodes in a network.

3.0 Node Configuration

A node configuration comprises a set of one or more configuration commands or items that a particular network device, or a particular type of network device, is configured to analyze and process in order to configure the particular network device. A node configuration may be stored in a file, which is processed by a target network device for configuring. A node configuration may be a running configuration that a target node uses to configure itself while the target node is running. Alternatively, a node configuration may be a startup configuration that a target node uses to configure itself when the target node starts up.

A configuration command or item comprises a keyword and zero or more parameter values and conforms to a syntax. If a particular configuration item is incorrect (for example, the keyword is incorrect or the number of parameter values in the particular configuration item does not match the number of parameter values for the syntactically correct command), then a network device that processes the particular configuration item may ignore the particular configuration item, succeeding configuration items, configuration items that depend on the particular configuration item, and/or the entire node configuration.

A configuration item may take up a single line or multiple lines of a command line interface (CLI). A CLI may be displayed on a computing device that is directly coupled to the network device that is being configured based on commands entered via the CLI. Alternatively, the CLI may be displayed on a computing device that is communicatively coupled (and not directly connected) to one or more network devices that are, for example, in the same network or in a remote network.

The following illustrates three example node configurations: C1, C2, and C3:

C1:
config firewall permit Alice
config firewall permit Bob
config firewall permit Charlie
config firewall deny Skype
video-monitoring disable C2:
config firewall permit Alice
config firewall permit Bob
config firewall permit David
video-monitoring disable C3:
config QoS TP highest
video-monitoring enable C1 and C2 are similar while C3 is relatively different than C1 and C2. Individually, C1 and C2 may be more complex than C3. However, C3 "stands out" because C3 is very much unlike C1 and C2.

4.0 Complexity Factors

Multiple aspects of a network may contribute to the network's complexity, such as topology and structure, the number and heterogeneity of network devices, and the networking features that are utilized. The configuration of individual network devices (referred to herein as "nodes") in a network is one significant contributor to a network's complexity. Factors that may be used to generate a complexity score for a node's configuration are referred to herein as "node configuration complexity factors," examples of which include: the number of lines in a configuration; the number of configuration items (some of which may be longer than a single line); the number or average number of configuration parameters per item or line; how common the configuration items are (e.g., configuration items that are rarely used or are relatively uncommon add more complexity than relatively common configuration items; "commonness" may be computed using TFIDF, which refers to the proportion that a configuration item has in a configuration measured over multiple configurations, versus the configuration that is being analyzed); the number of "siblings" of an item, which refers to the number of options of a configuration command (e.g., a command with 1,000 options is more complex than a command with only two options); the number of "intra-node configuration dependencies," which is a number of configuration items and/or parameter values that need to be "remembered" for later configuration items; and "memory depth" of an intra-node configuration dependency, which is the distance between two configuration items of the intra-node configuration dependency. Distance, in this context, refers to separation in terms of number of lines or items. Other individual node configuration factors that relate to intra-node configuration dependencies may include average distance between configuration items of an intra-node configuration dependencies and variance of all the distances between configuration items of an intra-node configuration.

An example of an intra-node configuration dependency is one command that configures a maintenance association (MA) (defined in IEEE 802.1ag) and a later command that refers to that MA. Another example of an intra-node configuration dependency is a command that names an access control list (ACL) (that contains firewall rules) and a later command that attaches the ACL to an interface. In this way, the node knows which firewall rules to apply to the given interface. For example, "config ACL myacl" (where "config" is the name of the command and "myacl" is the name of the ACL) is one configuration item and another configuration item in the same node configuration is "congif interface attach acl myacl" (where "myacl" is the name of the ACL and "interface" is the name of an interface).

Multiple scoring techniques may be used to calculate a score for an individual node's complexity. Embodiments are not limited to any particular scoring technique. One example scoring technique involves: adding a point for each line in a node's configuration; adding a point for the number of configuration parameters per line; adding five points for each intra-node configuration dependency; and/or adding ten points for each intra-node configuration dependency that has a memory depth of ten or greater. A related example involves adding a number of points equal to the memory depth of each intra-node configuration complexity. Thus, if the memory depth of a first intra-node configuration complexity is eight and the memory depth of a second intra-node configuration complexity is sixteen, then at least 24 points will be added to the complexity score for the node's configuration.

The complexity of the overall configuration of a network is not simply identical to the sum of individual device configurations. In addition to the complexity of individual node configurations, one or more other factors impact network configuration complexity. Such factors are referred to herein as "inter-node configuration complexity factors." Example inter-node configuration complexity factors include the "degree of similarity" between device configurations and a number of inter-node configuration dependencies, i.e., parameter values and configuration items that depend on another node's configuration. One or both of these inter-node configuration factors may be used in generating a configuration complexity score for a network.

In an embodiment, the "degree of similarity" between two node configurations indicates the level of sameness of the two or more node configurations. In general, greater similarity between device configurations translates to lower complexity of the overall network configuration. For this reason, the application of cookie-cutter configuration templates may reduce complexity. Not only do such templates facilitate automation of provisioning tasks, but application of such templates results in a high degree of similarity between node configurations, which limits overall network configuration complexity.

Multiple techniques may be used to calculate a similarity score for two node configurations and embodiments are not limited to any particular technique. A similarity scoring technique may take into account one or more factors, referred to herein as "inter-node difference factors." Examples of "inter-node difference factors" include: the number of characters that need to be changed to convert one node configuration to another node configuration; the number of configuration items or lines that are different in any way between two node configurations; the number of parameter values that are different between two node configurations; the difference in the number of configuration lines and/or items; or a difference in CLI languages used. For example, the fact that two node configurations are based on different CLI languages may have a dampening effect on a similarity score between the two node configurations. In other words, all else being equal, dissimilar CLI languages decreases a similarity score.

As noted previously, in addition to degree of similarity, the number of inter-node configuration dependencies is another example of an inter-node configuration complexity factor. An inter-node configuration dependency is one where a parameter value or configuration item that depends on another node's configuration. Thus, a configuration of one node dictates one or more parameter values or configuration items in another node configuration. An example of an inter-node configuration dependency regards a continuity check message (CCM) transmission interval for nodes in the same maintenance association (MA), where the configuration item or command is "config MA 150 CCM 150." "MA 150" refers to maintenance association 150 and "CCM 500" refers to a number of milliseconds between the transmission of CCMs. Each node in MA 150 may need to configure the same value of CCM (i.e., 500 in this example) for that MA.

As another example, if two configuration items in different node configurations need to have the same IP address as a parameter value in each configuration item, then it is determined that the two configuration items are dependent on each other. A dependency may be automatically assumed if it is determined that two configuration items in different node configurations have the same parameter value. Alternatively, a dependency may be automatically determined if there is an explicit instruction (for example, in one of the two node configurations, in a template of one of the two node configurations, or in user input) that two configuration items depend on each other.

5.0 Analysis of Network Complexity

In an embodiment, computer-implemented processes are configured to generate a network complexity score based on individual node configuration complexity factors and one or more inter-node configuration complexity factors. A network complexity score may be a single value, which may be mapped to one of multiple pre-defined complexity ranges, which may be denoted using labels such as "High Complexity", "Medium Complexity," and "Low Complexity." The network complexity score may then be displayed using a computer display unit. Knowing a network complexity score and/or a complexity range to which a particular network belongs may be helpful to an individual or entity that manages or is responsible for multiple networks. With such knowledge, networks with relatively low complexity may be analyzed to determine one or more factors that make them less complex and apply those factor(s) to relatively more complex networks.

However, a single network complexity score without more may not be useful, for example, to a network administrator who manages a single network. Thus, in an embodiment, a network configuration complexity score is computed incrementally for sets of nodes in a network. A graphical representation is generated based on multiple network complexity scores and displayed on a computer screen. The graphical representation assists users in identifying sources for overall network complexity, identifying node configuration outliers and hotspots for network configuration inconsistencies, and subsequently taking targeted measures to improve network operations. A network configuration inconsistency may involve, for example, an inconsistent configuration of timer values or an inconsistent reference to a "domain name."

In an embodiment, network complexity assessor 116 comprises:

1. a complexity function that computes the configuration complexity of a set of nodes in a network;

2. a process for determining, for a network, an incremental series of sets of nodes for which the configuration complexity is computed, such that the additional node that is chosen in each step minimizes the amount of additional network complexity that is incurred; and 3. a graphical visualization system that represents a graph representation of the output of the process.

Each of these components is further described in the following sections.

5.1 Assessment of Complexity Across a Set of Network Nodes

In an embodiment, network complexity assessor 116 is configured to determine the complexity of a network configuration. The network complexity assessor 116 may or may not characterize every aspect of configuration complexity. In an embodiment, network complexity assessor 116 may be configured to determine complexity using computer-implemented algorithms for the following:

(1) the more overlap between two node configurations (i.e., the more similar they are) the lower the complexity score of the pair;

(2) node configurations that utilize common settings and conform to a cookie cutter scheme will have a lower complexity score than node configurations that do not share common settings;

(3) dependencies between individual configuration items increase the complexity score;

(4) complexity increases with the number of node configurations (i.e., complexity({A, B})<complexity({A, B, C}));

(5) other things being equal, a larger number of configuration items per node results in a higher complexity score than a lower number of configuration items;

(6) the function is commutative (in other words, the order in which different devices are considered does not affect the network configuration complexity score); and (7) the function is not associative (i.e., complexity(A)+complexity(B)=complexity({A, B}) is not true in the general case).

In an embodiment, the complexity score of a set of nodes is generally not the same as the sum of complexity scores of individual nodes or subsets of nodes. In other words, a network with a large number of devices, each with high individual configuration complexity, might have a lower overall complexity score than a network with devices with lower individual configuration complexity, but a higher degree of dissimilar node configurations.

In an embodiment, the network complexity function is configured to combine the configurations of all nodes in the set into a single network configuration file and to provide the network configuration file to a network complexity function.

In an embodiment, combining configurations may comprise appending the configuration of the latest node to the configuration of the set. However, the resulting complexity at least partially masks commonalities among different node configurations. In an embodiment, the process is configured for weaving each added node configuration into the existing file in a way that minimizes, for each configuration item of the node configuration, the complexity of the file over all. For example, commands of the same type may be grouped across nodes.

In an embodiment, the network complexity function assesses the resulting network configuration file, for example, by counting the number of unique lines in the network configuration file. Additionally or alternatively, a number of unique tokens in the network configuration file is determined; in this context, a token may comprise a CLI command keyword, parameter keyword, or other discrete value in a line of configuration code. Additionally or alternatively, factors such as the number of inter-node configuration dependencies are considered.

In an embodiment, the network complexity function is configured to determine a number of configuration items in the single network configuration file; determine a number of distinct configuration "commands" in the network configuration file, as well as statistical properties, such as a median of the occurrence of each distinct command; and determine the memory depth for command parameter values and compute statistical properties from the memory depth. In this context, the memory depth for command parameter values comprises the number of steps between the first and the last reference to a particular parameter value, and statistical properties may comprise maximum memory depth or 90th percentile.

The network complexity function then combines the individual factors to generate an overall network complexity score.

5.2 Determining Incremental Set of Nodes

The above example network complexity functions determine the network configuration complexity for a given set of nodes in a network in different ways. In an embodiment, the assessor 116 is configured to determine the order in which to incrementally add nodes to the set of nodes for which complexity is determined. In an embodiment, multiple network complexity scores are calculated, one for each different subset of the nodes in a network, where each succeeding subset is a superset of the preceding subset. For example, a first network complexity score is calculated for node A, then a second network complexity score is calculated for nodes A and B, then a third network complexity score is calculated for nodes A, B, and C. Node configurations that have been considered when calculating a network complexity score are said to be in the "assessment set." Initially, the assessment set is empty. Node configurations that will be considered when calculating a network complexity score but are not yet in the assessment set are said to be in the "candidate set." Initially, the candidate set contains the configurations of all the nodes in the network, or at least the node configurations for which network complexity is to be determined. In other words, configurations of one or more nodes in a network may be intentionally excluded from being considered when calculating a complexity score for the network. Node configurations are added to the assessment set in such a way that the node configuration that is to be added next to the assessment set adds the least complexity to the assessment set. In this way, users can more easily identify (1) areas of "sameness" and (2) "outliers" in the network.

Figure 2:
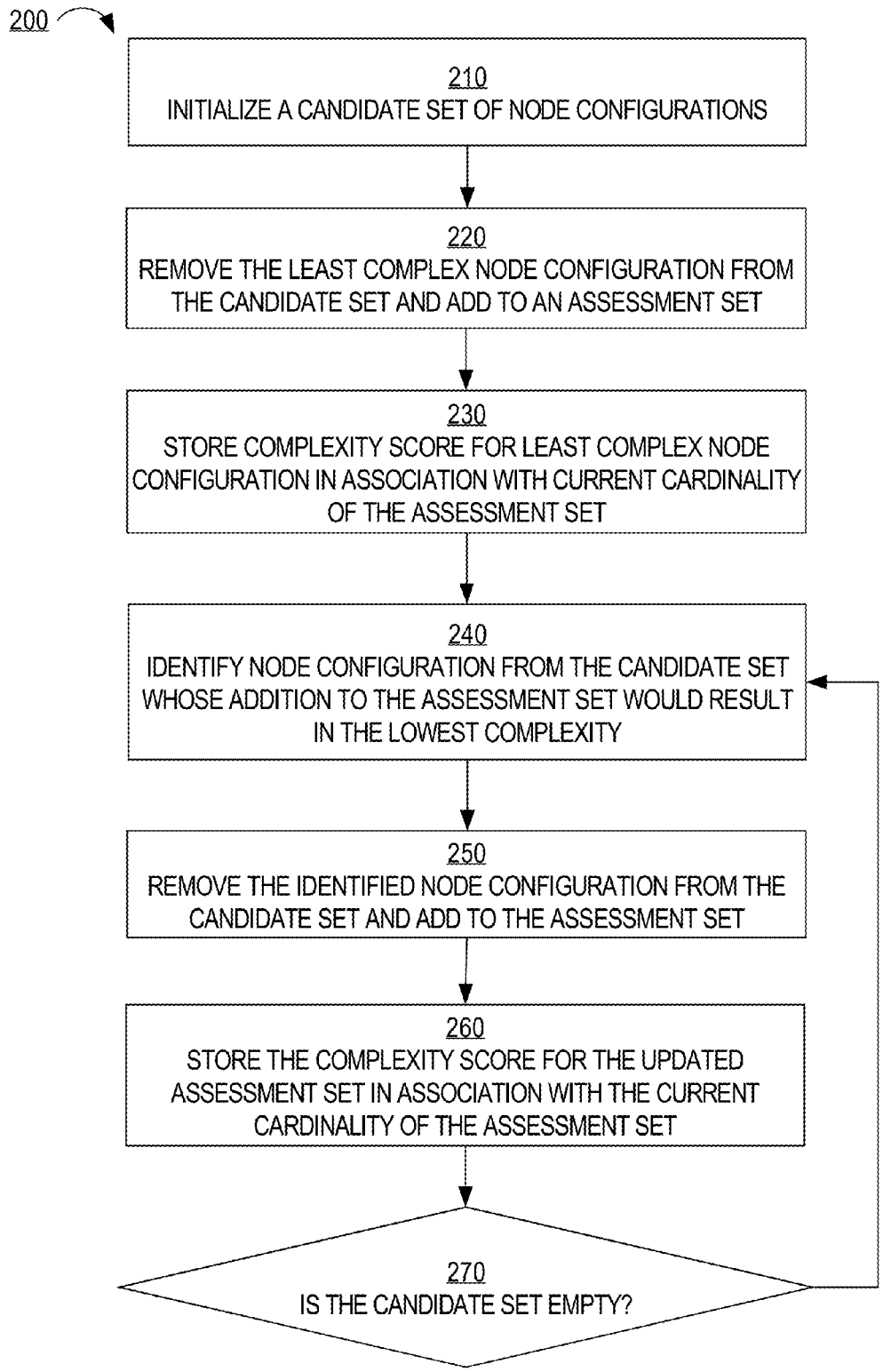
FIG. 2 illustrates a process for generating multiple complexity scores for a network, in an embodiment.

FIG. 2 illustrates a process for calculating network complexity scores for different node subsets of a network, in an embodiment. Process 200 may be performed by a computing device that has access to configurations of a plurality of nodes in a network and that is operated by a network administrator. Examples of computing devices include a desktop computer, a laptop computer, a tablet computer, and a smartphone. The network complexity assessor 116 may be configured to implement process 200 in software, hardware, or a combination of software and hardware.

At block 210, the candidate set is initialized. The candidate set may include configurations of all the nodes in a network. For example, a network administrator may provide single input that indicates that an incremental complexity analysis is to be performed on a network. In response to receiving the input, a network complexity assessor identifies all nodes in the network. Alternatively, the candidate set may exclude the configuration of one or more nodes in the network. For example, in addition to providing input that initiates the network complexity assessor, a user provides input that indicates or specifies one or more nodes for the network complexity assessor to exclude from the analysis.

At block 220, the node configuration, in the candidate set, with the lowest configuration complexity relative to the other node configurations in the candidate is identified and added to the assessment set. Block 220 may involve calculating an individual node configuration complexity score for each node configuration in the candidate set and determining which the calculated individual configuration complexity scores is the lowest.

Alternatively, at block 220, a node configuration is selected from the candidate set using one or more other criteria and then added to the assessment set. For example, a node configuration is selected at random. As another example, a network administrator or other user may select a particular node as a "starting point" and the configuration of that particular node is selected in block 220.

In a related embodiment, the node configurations in the candidate set are organized into two or more groups based on one or more criteria. For example, node configurations may be organized by node type, model number, manufacturer, and CLI language. Node type may be, for example, router or switch. For example, one group may include nodes A, B, and C while another group may include nodes D and E. In this embodiment, a user may provide input that indicates which group with which to start. For example, if a user selects a particular group, then block 220 involves only analyzing nodes from that particular group to identify the node whose complexity is the lowest relative to other nodes in the particular group.

At block 230, the complexity score computed for the identified node configuration in block 220 is stored in association with the cardinality of one. A mapping that maps a complexity score to a cardinality and to the node configuration that was most recently added to the assessment set may be termed a "configuration-score mapping." After block 230, the configuration-score mapping has a single association.

At block 240, the process identifies a node configuration, from the candidate set, the addition of which to the assessment set results in the lowest configuration complexity for the assessment set.

Block 240 may involve calculating multiple network complexity scores, one for each possible new assessment set that adds a single node from the candidate set. For example, if the assessment set includes node A and the candidate set includes nodes B, C, and D, then three complexity scores are generated: one for set {A, B}, one for set {A, C}, and one for set {A, D}. The lowest of the multiple complexity scores is used to identify the node configuration to add to the assessment set. Returning the above example, if the complexity score for set {A, C} is lowest, then the configuration for node C is added to the assessment set.

Given the example above regarding example node configurations C1, C2, and C3, the network complexity of {C1, C2} may be lower than, for example, {C1, C3} even though the sum of the individual complexities of {C1} and {C2} may be larger than the sum of individual complexities {C1} and {C3}.

In the embodiment where the nodes in the candidate set are organized into groups, then block 240 may be limited to only considering nodes from a group from which a node was selected in block 220. For example, if there are groups I, II, and III in the candidate set, and a node from group II was selected in block 220, then block 240 may involve only considering the other nodes in group II when determining which node to add next to the assessment set. In subsequent iterations of block 240, the same restriction is followed until there are no more nodes in group II. When group II is done, then block 240 may involve considering nodes from multiple groups in the candidate set or considering only nodes from a single group. For example, user input may have selected an ordering of groups such that all nodes in one group in a candidate set are analyzed for adding to the assessment set before considering nodes from any other group in the candidate set.

At block 250, the node configuration identified in block 240 is removed from the candidate set and added to the assessment set.

At block 260, the complexity score computed for the new assessment set (in block 240) is stored in association with the cardinality of the size of the assessment set. In other words, the configuration-score mapping is updated to include another association.

The cardinality of the assessment set after the first iteration of block 260 is two and the configuration-score mapping may be, for example, {(A, 8), (B, 9)}. After the second iteration of block 260, the cardinality of the assessment set will be three and the configuration-score mapping may be, for example, {(A, 8), (B, 9), (D, 10)}. After the third iteration of block 260, the cardinality of the assessment set will be four and the configuration-score mapping may be, for example, {(A, 8), (B, 9), (D, 10), (G, 14)}.

At block 270, it is determined whether the candidate set is empty. If not, then process 200 returns to block 240.

By implementing process 200, the node configurations in a network are ordered in a way such that the marginal complexity of adding a node configuration (to an assessment set) is minimal. As a brief overview, block 220 involves identifying the simplest (or least complex) node configuration while block 240 involves identifying the node configuration whose joint complexity with the simplest node configuration is minimal. Block 240 is performed recursively until the node configurations that were initially in the candidate set have been ordered.

5.3 Graphical Representation

Figure 3:
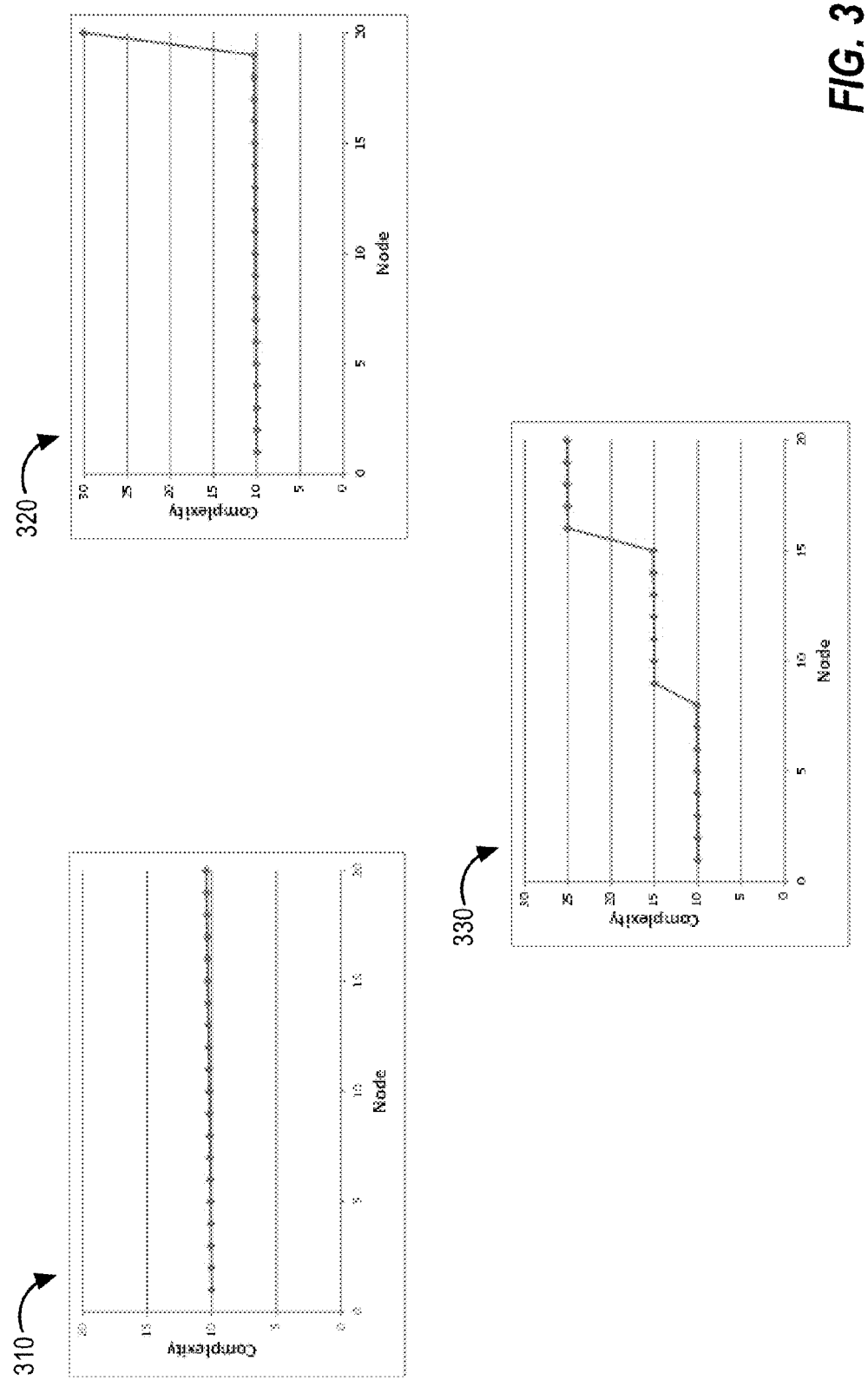
FIG. 3 illustrates three graphs depicting examples of network complexity in three different types of networks, in an embodiment.

In an embodiment, a result of process 200 may be graphically visualized as a two-dimensional line chart, and in some embodiments, the process may cause displaying such a chart on a computer display unit. In an embodiment, the x-axis represents the cardinality of the assessment set and the y-axis represents the cumulative complexity of the network configuration for the assessment set at a particular cardinality. FIG. 3 illustrates three graphs depicting examples of network complexity in three different types of networks, in an embodiment.

The first point on the x-axis of each graph 310, 320, 330 in FIG. 3 represents the network configuration consisting of the single device with the least complex configuration in the network. Subsequent points represents increasingly larger assessment sets to which the configuration of additional nodes is added. The last point contains the set of all nodes in the network. The resulting complexity represents the combined network configuration complexity over all nodes. At each point of the x-axis, the node that was added to the assessment set may be noted.

Each of graphs 310, 320, 330 shows, in order, the contribution of nodes to overall network complexity. Graph 310 depicts network complexity for a network where the configuration of all devices is practically identical. Thus, the line in graph 310 is practically horizontal, indicating that the incremental complexity of adding another node during process 200 is minimal.

The node with the highest individual configuration complexity may not be the node that adds the most to overall network complexity. For example, a node might have high individual configuration complexity but be very similar in the way in which it is configured to other nodes, while a node with a lower individual configuration complexity might contribute more to network configuration complexity because it resembles an outlier item. Such an outlier item is depicted in graph 320. In the corresponding network, the configuration of all devices but one is practically identical. The remaining outlier node has a configuration that is significantly different from that of other nodes.

If an outlier node is the least complex relative to all other nodes in the network, then the outlier node may have been selected as the first node in the assessment set. In such a scenario, the resulting graph may show the first point, followed by a relatively steep increasing slope to the second point, followed by many points that form a relatively gentle increasing slope. In other words, the resulting graph may be the line in graph 320, except where the line is rotated 180 degrees.

Likewise, subsets of nodes in the network that are configured similarly will show up as plateaus, whereas nodes with dissimilar configurations will result in a steeper gradients and/or step functions. Such a scenario is depicted in graph 330. Plateaus of nodes may result when templates are used to configure multiple nodes. A network that comprises different sets or clusters of nodes, where each node in a cluster has a very similar configuration, but where the configuration across clusters is significantly different In an embodiment, the graphical representation also highlights, distinguishes or otherwise identifies nodes that have inter-node configuration dependencies. For example, nodes that have inter-node configuration dependencies with each other may have a border of a particular color. If there are multiple sets of inter-node dependencies, then each set may be displayed with a different color, while nodes that are not involved in inter-node configuration dependencies may be displayed in black. Because such dependencies are a likely source of network problems, highlighting such nodes allows a user to be quickly notified of significant sources network complexity and immediately analyze the relevant node configurations.

Thus, embodiments provide significant benefits to users, such as network administrators. Some embodiments help users understand sources of disproportional network configuration complexity and address the root causes of such complexity. To reduce complexity, those node configurations may be a good place to start making changes.

Some embodiments may be used to guide configuration activities in a way that minimizes the complexity in which to set up a network for a given purpose.

Some embodiments provide a way to compare the complexity of different networks used for similar purposes, which can be important for managed service providers. Benchmarking complexity, for example, can reveal which networks have least complexity and allow a managed service provider to suggest, to a network provider that owns a relatively complex network, networking practices that may help reduce the complexity of the network provider's network.

By identifying areas of similar configuration, reusable configuration patterns can be identified, resulting in further lowering of complexity. In an embodiment, configuration templates can be derived from a set of node configurations that are identified as relatively similar. For example, network complexity assessor 116 determines, based on the slope of a line in a graph, that a set of nodes are similar. The network complexity assessor 116 then compares two or more nodes in the set to identify the common configuration items and any differences. The common configuration items are used to create a template that may be used for similar types of nodes. Any differences between node configurations may appear as options in the template. Using such templates may result in additional operational efficiency gains.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
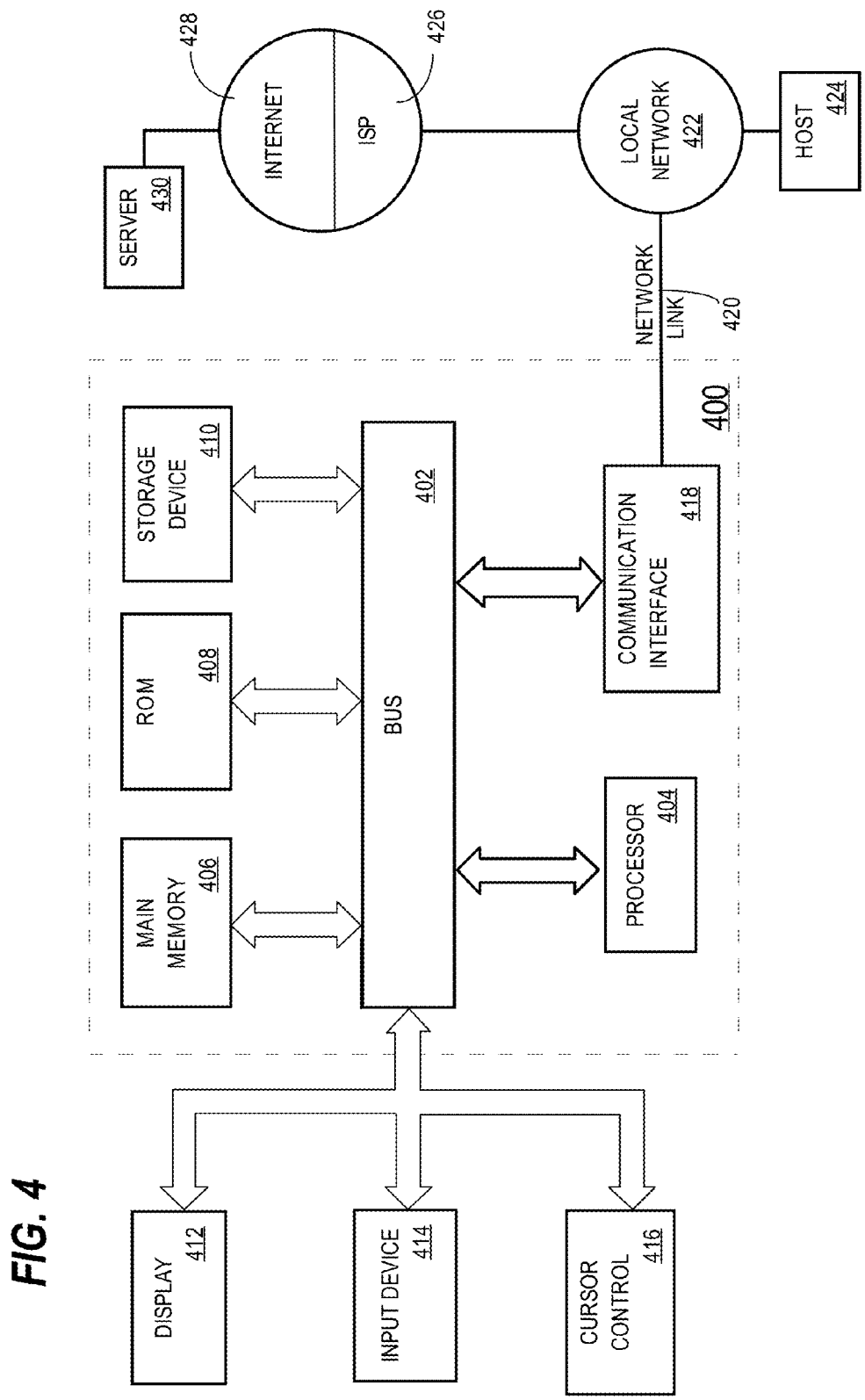
FIG. 4 illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7.0 Extensions and Alternatives

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   identifying a plurality of node configurations, each of which corresponds to a different node in a network and is in a candidate set;
   wherein the plurality of node configurations includes a first node configuration and a second node configuration;
   removing the first node configuration from the candidate set;
   adding the first node configuration to an assessment set;
   while the assessment set includes the first node configuration and does not include the second node configuration, determining a first complexity score for the assessment set;
   after determining the first complexity score, removing the second node configuration from the candidate set;
   adding the second node configuration to the assessment set;
   while the assessment set includes the first node configuration and the second node configuration, determining a second complexity score for the assessment set, wherein the second complexity score is different than the first complexity score;

wherein the method is performed by one or more computing devices.

2. The method of claim 1, further comprising:

storing a set of configuration-score associations, each of which associates a different node configuration of the plurality of node configurations with a different complexity score of a plurality of complexity scores.

3. The method of claim 2, further comprising:

generating, based on the set of configuration-score associations, a graph that includes a first axis and a second axis;

wherein points on the first axis correspond to the plurality of node configurations;

wherein points on the second axis correspond to the plurality of complexity scores.

4. The method of claim 1, further comprising, prior to adding the first node configuration to the assessment set:

generating a plurality of potential complexity scores, each of which is generated based on a different node configuration in the candidate set;

selecting, from among the plurality of potential complexity scores, a particular complexity score that is lower than the other potential complexity scores in the plurality of potential complexity scores;

wherein removing the adding the first node configuration to the assessment set is based on selecting the particular complexity score and determining that the particular complexity score is associated with the first node configuration.

5. The method of claim 1, further comprising, after determining the first complexity score and before removing the second node configuration from the candidate set:

for each node configuration of multiple node configurations in the candidate set:

generating a potential complexity score based on one or more node configurations that are in the assessment set and said each node configuration, and adding the potential complexity score to a set of potential complexity scores;

selecting, from among the set of potential complexity scores, a particular complexity score that is lower than the other potential complexity scores in the set of potential complexity scores;

determining that the particular complexity score is associated with the second node configuration;

wherein removing the second node configuration from the candidate set is based on selecting the particular complexity score and determining that the particular complexity score is associated with the second node configuration.

6. The method of claim 1, wherein:

adding the first node configuration to the assessment set comprises adding the first node configuration to a particular file;

adding the second node configuration to the assessment set comprises adding the second node configuration to the particular file;

wherein determining the second complexity score for the assessment set while the assessment set includes the first node configuration and the second node configuration comprises analyzing the particular file.

7. The method of claim 6, wherein:

the first node configuration comprises a first plurality of configuration items that includes a first configuration item and a second configuration item that follows the first configuration item;

the second node configuration comprises a second plurality of configuration items that includes a particular configuration item;

adding the second node configuration to the particular file comprises inserting, in the particular file, the particular item between the first configuration item and the second configuration item.

8. The method of claim 1, wherein the first complexity score is based on one or more of a number of configuration items in the first node configuration, a number of lines in the first node configuration, a number of configuration parameters per configuration item in the first node configuration, a number of intra-node configuration dependencies in the first node configuration, or a memory depth for one or more intra-node configuration dependencies in the first node configuration.

9. The method of claim 1, wherein determining the second complexity score is based, at least in part, on (a) a degree of similarity between the first node configuration and the second node configuration or (b) a dependency between the first node configuration and the second node configuration.

10. The method of claim 9, further comprising:

determining the degree of similarity between the first node configuration and the second node configuration based, at least in part, on: (1) a number of characters that need to be changed to convert the second node configuration to the first node configuration; (2) a number of configuration items or lines that are different in any way between the first and second node configurations; (3) a number of parameter values that are different between the first and second node configurations; or (4) a difference in the number of configuration lines or configuration items between the first and second node configurations.

11. The method of claim 9, wherein:

determining the second complexity score is based, at least in part, on a dependency between the first node configuration and the second node configuration;

the dependency is between a first configuration item in the first node configuration and a second configuration item in the second node configuration.

12. A non-transitory computer-readable storage medium storing instructions that, when executed by a computer, cause the computer to perform a method comprising:

identifying a plurality of node configurations, each of which corresponds to a different node in a network and is in a candidate set;

wherein the plurality of node configurations includes a first node configuration and a second node configuration;

removing the first node configuration from the candidate set;

adding the first node configuration to an assessment set;

while the assessment set includes the first node configuration and does not include the second node configuration, determining a first complexity score for the assessment set;

after determining the first complexity score, removing the second node configuration from the candidate set;

adding the second node configuration to the assessment set;

while the assessment set includes the first node configuration and the second node configuration, determining a second complexity score for the assessment set, wherein the second complexity score is different than the first complexity score;

wherein the method is performed by one or more computing devices.

13. The non-transitory computer-readable storage medium of claim 12 further comprising instructions which, when executed by a computer, cause prior to adding the first node configuration to the assessment set:

generating a plurality of potential complexity scores, each of which is generated based on a different node configuration in the candidate set;

selecting, from among the plurality of potential complexity scores, a particular complexity score that is lower than the other potential complexity scores in the plurality of potential complexity scores;

wherein removing the adding the first node configuration to the assessment set is based on selecting the particular complexity score and determining that the particular complexity score is associated with the first node configuration.

14. The non-transitory computer-readable storage medium of claim 12 further comprising instructions which, when executed by a computer, cause after determining the first complexity score and before removing the second node configuration from the candidate set:

for each node configuration of multiple node configurations in the candidate set:

generating a potential complexity score based on one or more node configurations that are in the assessment set and said each node configuration, and adding the potential complexity score to a set of potential complexity scores;

selecting, from among the set of potential complexity scores, a particular complexity score that is lower than the other potential complexity scores in the set of potential complexity scores;

determining that the particular complexity score is associated with the second node configuration;

wherein removing the second node configuration from the candidate set is based on selecting the particular complexity score and determining that the particular complexity score is associated with the second node configuration.

15. The non-transitory computer-readable storage medium of claim 12 wherein:

adding the first node configuration to the assessment set comprises adding the first node configuration to a particular file;

adding the second node configuration to the assessment set comprises adding the second node configuration to the particular file;

wherein determining the second complexity score for the assessment set while the assessment set includes the first node configuration and the second node configuration comprises analyzing the particular file.

16. The non-transitory computer-readable storage medium of claim 15 wherein:

the first node configuration comprises a first plurality of configuration items that includes a first configuration item and a second configuration item that follows the first configuration item;

the second node configuration comprises a second plurality of configuration items that includes a particular configuration item;

adding the second node configuration to the particular file comprises inserting, in the particular file, the particular item between the first configuration item and the second configuration item.

17. The non-transitory computer-readable storage medium of claim 12, wherein the first complexity score is based on one or more of a number of configuration items in the first node configuration, a number of lines in the first node configuration, a number of configuration parameters per configuration item in the first node configuration, a number of intra-node configuration dependencies in the first node configuration, or a memory depth for one or more intra-node configuration dependencies in the first node configuration.

18. The non-transitory computer-readable storage medium of claim 12, wherein determining the second complexity score is based, at least in part, on (a) a degree of similarity between the first node configuration and the second node configuration or (b) a dependency between the first node configuration and the second node configuration.

19. The non-transitory computer-readable storage medium of claim 18 further comprising instructions which, when executed by a computer, cause:

determining the degree of similarity between the first node configuration and the second node configuration based, at least in part, on: (1) a number of characters that need to be changed to convert the second node configuration to the first node configuration; (2) a number of configuration items or lines that are different in any way between the first and second node configurations; (3) a number of parameter values that are different between the first and second node configurations; or (4) a difference in the number of configuration lines or configuration items between the first and second node configurations.

20. The non-transitory computer-readable storage medium of claim 18, wherein:

determining the second complexity score is based, at least in part, on a dependency between the first node configuration and the second node configuration;

the dependency is between a first configuration item in the first node configuration and a second configuration item in the second node configuration.

* * * * *